United States Patent [19]

Belmont et al.

[11] Patent Number: 5,968,243
[45] Date of Patent: Oct. 19, 1999

[54] MODIFIED CARBON PRODUCTS WITH LEAVING GROUPS INKS AND COATINGS CONTAINING MODIFIED CARBON PRODUCTS

[76] Inventors: James A. Belmont, Acton; Curtis E. Adams, Watertown, both of Mass.

[21] Appl. No.: 09/129,785

[22] Filed: Aug. 6, 1998

Related U.S. Application Data

[63] Continuation-in-part of application No. 08/909,944, Aug. 12, 1997.

[51] Int. Cl.[6] ............................................. C09C 1/44
[52] U.S. Cl. ..................... 106/31.65; 106/472; 106/473; 106/476; 106/478; 106/31.6; 106/31.9
[58] Field of Search ........................... 106/31.6, 472, 106/473, 476, 478

[56] References Cited

U.S. PATENT DOCUMENTS

| | | | |
|---|---|---|---|
| T860,001 | 3/1969 | Gessler . | |
| 2,121,535 | 6/1938 | Amon | 106/473 |
| 2,439,442 | 4/1948 | Amon et al. | 23/209.1 |
| 2,793,100 | 5/1957 | Weihe | 423/460 |
| 2,867,540 | 1/1959 | Harris | 106/476 |
| 3,011,902 | 12/1961 | Jordon . | |
| 3,025,259 | 3/1962 | Watson et al. | 106/476 |
| 3,317,458 | 5/1967 | Clas et al. . | |
| 3,335,020 | 8/1967 | Aboytes et al. | 106/476 |
| 3,423,391 | 1/1969 | Kindler et al. . | |
| 3,528,840 | 9/1970 | Aboytes | 106/473 |
| 3,671,476 | 6/1972 | Terai et al. . | |
| 3,686,111 | 8/1972 | Makhlouf et al. | 524/530 |
| 4,006,031 | 2/1977 | Ferch et al. | 106/473 |
| 4,014,844 | 3/1977 | Vidal et al. | 106/472 |
| 4,265,768 | 5/1981 | Beasley et al. | 210/682 |
| 4,320,011 | 3/1982 | Sato et al. | 210/694 |
| 4,366,139 | 12/1982 | Kühner et al. | 423/449 |
| 4,452,638 | 6/1984 | Gallus . | |
| 4,530,961 | 7/1985 | Nguyen et al. . | |
| 4,537,633 | 8/1985 | Hong . | |
| 4,597,794 | 7/1986 | Ohta et al. . | |
| 4,820,751 | 4/1989 | Takeshita et al. | 523/215 |
| 4,831,011 | 5/1989 | Oikawa et al. | 502/406 |
| 5,130,363 | 7/1992 | Scholl et al. | 524/392 |
| 5,159,009 | 10/1992 | Wolff et al. | 106/475 |
| 5,184,148 | 2/1993 | Suga et al. . | |
| 5,190,582 | 3/1993 | Shinozuka et al. . | |
| 5,281,261 | 1/1994 | Lin . | |
| 5,282,887 | 2/1994 | Gay et al. | 106/261 |
| 5,401,313 | 3/1995 | Supplee et al. | 106/475 |
| 5,554,739 | 9/1996 | Belmont | 534/885 |
| 5,559,169 | 9/1996 | Belmont et al. | 523/215 |
| 5,571,311 | 11/1996 | Belmont et al. . | |
| 5,575,845 | 11/1996 | Belmont et al. | 106/712 |
| 5,630,868 | 5/1997 | Belmont et al. | 106/31.75 |
| 5,654,357 | 8/1997 | Menashi et al. | 524/495 |
| 5,672,198 | 9/1997 | Belmont . | |
| 5,698,016 | 12/1997 | Adams et al. | 106/31.6 |
| 5,707,432 | 1/1998 | Adams et al. | 106/31.6 |
| 5,713,988 | 2/1998 | Belmont et al. | 106/31.6 |

FOREIGN PATENT DOCUMENTS

| | | |
|---|---|---|
| 0 006 190 A1 | 1/1980 | European Pat. Off. . |
| 0 475 075 A1 | 3/1992 | European Pat. Off. . |
| 0 050 354 | 4/1992 | European Pat. Off. . |
| E 72775 | 4/1960 | France . |
| 1331889 | 5/1963 | France . |
| 1948443 | 4/1971 | Germany . |
| 23 55 758 | 5/1975 | Germany . |

(List continued on next page.)

OTHER PUBLICATIONS

Derwent Abstract, AN No. 80–03330C, "Sulphonated Carbon Pigment Production by Treating Technical Grade Carbon with Hot Aqueous Acid," SU,A, 659523, Apr. 1979.

Derwent Abstract, AN No. 82–28019E, "Penetrating Flexographic Print Ink Based Polyacrylic Resin," Oct. 17, 1979, SU,A, 834062.

Derwent Abstract, AN No. 86–335147, "Wear Resistant Rubber Composition for Tire Tread Rubber," Apr. 30, 1985, JPA 61–250042, Nov. 1986.

Derwent Abstract, AN N. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Apr. 18, 1995, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel,* vol. 43, No. 4, pp. 289–298, 1964, no month.

Roberts et al., *Basic Principles of Organic Chemistry,* Second Edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon,* vol. 25, No. 6, pp. 809–819, 1987, no month available.

International Search Report for PCT/US 97/08049 mailed Sep. 15, 1997.

Delamar et al., J. Am. Chem. Soc. 1992, 114, 5883–5884, no month available.

International Search Report for PCT/US98/16532 mailed Dec. 10, 1998.

Primary Examiner—Mark L. Bell
Assistant Examiner—Scott L. Hertzog

[57] ABSTRACT

A modified carbon product is described which comprises carbon having attached at least one organic group wherein the organic group comprises a) at least one aromatic group or a $C_1$–$C_{12}$ alkyl group, and b) a group having the formula -AG-Sp-LG-Z, wherein AG is an activating group, Sp is a spacer group, LG is a leaving group, and Z is a counterion, and wherein the aromatic or the $C_1$–$C_{12}$ alkyl group is directly attached to the carbon, and wherein the organic group is present in any amount. The present invention also relates to ink and coating compositions comprising these modified carbon products.

53 Claims, No Drawings

FOREIGN PATENT DOCUMENTS

| | | |
|---|---|---|
| 56-078629 | 6/1981 | Japan . |
| 59-82467 | 5/1984 | Japan . |
| 62-250073 | 10/1987 | Japan . |
| 6-067421 | 3/1994 | Japan . |
| 862018 | 3/1961 | United Kingdom . |
| 1191872 | 5/1970 | United Kingdom . |
| 2 188 311 | 9/1987 | United Kingdom . |
| Wo 91/02034 | 2/1991 | WIPO . |
| WO 91/15425 | 10/1991 | WIPO . |
| WO 92/13983 | 8/1992 | WIPO . |
| WO 95/01838 | 1/1995 | WIPO . |
| WO 96/18688 | 6/1996 | WIPO . |
| WO 96/18694 | 6/1996 | WIPO . |
| WO 96/18695 | 6/1996 | WIPO . |
| WO 96/18696 | 6/1996 | WIPO . |
| WO 96/37547 | 11/1996 | WIPO . |
| WO 97/47692 | 12/1997 | WIPO ............ 1/56 |

MODIFIED CARBON PRODUCTS WITH LEAVING GROUPS INKS AND COATINGS CONTAINING MODIFIED CARBON PRODUCTS

BACKGROUND OF THE INVENTION

This application is a continuation-in-part of U.S. Ser. No. 08/909,944 filed Aug. 12, 1997, incorporated in its entirety by reference herein.

FIELD OF THE INVENTION

This invention relates to modified carbon products and inks and coatings which contain modified carbon products.

DISCUSSION OF THE RELATED ART

Presently, predominant black pigments are carbon blacks such as furnace blacks which can be used as colorants either in dry, powdered form, a flushed paste, or liquid concentrate form. Generally, the form of the colorant influences the hue, permanency, bulk, opacity, gloss, rheology, end use, and print quality.

There are various classifications of inks used presently. These categories include printing inks, ultraviolet cure inks, ball-point inks, and stamp pad or marking inks. Generally, inks can be applied by letter press, lithographic, flexographic, gravure, silk screen, stencil, duplicating, and electrostatic. Inks thus can be found in such end uses as news, publication, commercial, folding carton, book, corrugated box, paper bag, wrapper, label, metal container, plastic container, plastic film, foil, laminating, food insert, sanitary paper, textile and the like. McGraw-Hill's *Encyclopedia of Science and Technology*, Vol. 7, pgs. 159–164, provides further details of the types of inks available and their uses, all of which is incorporated herein by reference.

Coatings can contain pigments as well and are used for decorative, protective, and functional treatments of many kinds of surfaces. These surfaces include, coils, metals, appliances, furniture, hardboard, lumber and plywood, marine, maintenance, automobile, cans, and paperboard. Some coatings, such as those on undersea pipelines, are for protective purposes. Others, such as exterior automobile coatings, fulfill both decorative and protective functions. Still others provide friction control on boat decks or car seats. Some coatings control the fouling of ship bottoms, others protect food and beverages in cans. Silicon chips, printed circuit panels, coatings on waveguide fibers for signal transmission, and magnetic coatings on video tapes and computer disks are among many so-called hi-tech applications for coatings.

Categories of aqueous vehicles for aqueous inks and coatings include those in which the binder is soluble in water, those in which it is colloidally dispersed, and those in which it is emulsified to form a latex. The combination of binder and volatile liquid is called the vehicle which may be a solution or a dispersion of fine binder particles in a non-solvent. Pigments are finely divided, insoluble, solid particles dispersed in the coating vehicle and distributed throughout the binder in the final film. Surfactants can be used as pigment dispersants. The components and manufacturing of aqueous coatings are further discussed in the *Concised Encyclopedia of Polymers, Science and Engineering*, pgs. 160–171 (1990), which is incorporated herein by reference.

Non-aqueous inks and coatings are used for many applications in which aqueous vehicles are not suitable. For instance, inks which are to be printed on hydrophobic, non-porous substrates such as metal, glass, or plastics must be fast-drying. Therefore, solvents such as ketones, esters, alcohols, or hydrocarbons are often used instead of water. Such solvent-based inks are used widely for printing on paper substrates and industrial labeling of cardboard boxes and various metal or plastic containers and components. Specific examples include news ink compositions and web off-set gloss heat-set ink compositions.

Inks and coatings are also required to be water resistant in certain situations. In such instances, water-resistant resins can be dissolved in non-aqueous solvents of ink and coating formulations to provide the desired water resistance upon drying. A primary use of such non-aqueous coatings is on metal and plastic automotive parts.

SUMMARY OF THE INVENTION

The present invention relates to a modified carbon product comprising carbon having attached at least one organic group wherein the organic group comprises a) at least one aromatic group or a $C_1$–$C_{12}$ alkyl group, and b) a group having the formula -AG-Sp-LG-Z, wherein AG is an activating group, Sp is spacer group that assists the activating group to promote elimination of the leaving group. LG is a leaving group, and Z is a counterion. The aromatic or the $C_1$–$C_{12}$ alkyl group is directly attached to the carbon. The present invention also relates to ink and coating compositions comprising these modified carbon products.

Carbon, as used herein, may be of the crystalline and/or amorphous type. Examples include, but are not limited to, graphite, carbon black, carbon fiber, vitreous carbon, and activated charcoal or activated carbon. Finely divided forms of the above are preferred; also, it is possible to utilize mixtures of different carbons.

DESCRIPTION OF THE PREFERRED EMBODIMENTS

The modified carbon product comprises carbon having attached at least one organic group, wherein the organic group comprises a) an aromatic group or a $C_1$–$C_{12}$ alkyl group and b) an ionic or ionizable group having the formula: -AG-Sp-LG-Z, wherein AG is an activating group, Sp is a spacer group that assists the activating group to promote elimination of the leaving group, LG. LG is a leaving group, and Z is a counterion. The activating group is any group that promotes elimination of the leaving group. Examples of activating groups include, but are not limited to, —$SO_2$—, —$NRSO_2$—, —NRCO—, —$O_2C$—, —$SO_2NR$ and the like. R is independently hydrogen, $C_1$–$C_{12}$ substituted or unsubstituted alkyl, $C_2$–$C_{12}$ substituted or unsubstituted alkenyl, cyanoethyl, or a substituted or unsubstituted $C_7$–$C_{20}$ aralkyl or alkaryl. The spacer group is preferably any ethylene group or a substituted ethylene group with at least one hydrogen on the carbon which is adjacent to -AG. The leaving group is any group that may be eliminated from the organic group which is attached to the carbon colorant or pigment. After the leaving group is eliminated from the organic group attached to the carbon product, the number of ionic or ionizable groups remaining attached to the carbon product is reduced. Examples of leaving groups include, but are not limited to, —$OSO_3^-$, —$SSO_3^-$, $OPO_3^{2-}$, $Q^+$, and the like. $Q^+$ is $NR_3^+$, $N(C_2H_4)_3N^+$, or a N-substituted heterocycle, such as pyridinium. The aromatic group or $C_1$–$C_{12}$ alkyl group is directly attached to the carbon and there are no limits on the amount of organic group present on the carbon. Preferably, the amount of organic group attached on the carbon is from about 0.10 to about 4.0 micromoles/m², more preferably from about 2.0 to about 3.3 micromoles/m² carbon used based on CTAB or t-area of the carbon. Suitable ionic or ionizable groups of the formula AG-Sp-LG-Z include, but are not limited to, $SO_2C_2H_4OSO_3^-M^+$, $SO_2C_2H_4SSO_3^-M^+$, $SO_2C_2H_4OPO_3^{2-}M_2^+$, $SO_2C_2H_4Q^+X^-$, $NRSO_2C_2H_4OSO_3^-M^+$, $NRSO_2C_2H_4SSO_3^-M^+$, $NRSO_2C_2H_4OPO_3^{2-}M_2^+$, $NRSO_2C_2H_4Q^+X^-$, $SO_2NRC_2H_4OSO_3^-M^+$, $SO_2NRC_2H_4SSO_3^-M^+$, $SO_2NRC_2H_4OPO_3^{2-}M_2^+$, $SO_2NRC_2H_4Q^+X^-$, $NRCOC_2H_4OSO_3^-M^+$, $NRCOC_2H_4SSO_3^-M^+$, $NRCOC_2H_4Q^+X^-$, $O_2CC_2H_4OSO_3^-M^+$, $O_2CC_2H_4SSO_3^-M^+$, $SO_2C_2H_4SO_2C_6H_4SO_3^-M^+$, $SO_2C_2H_4SO_2C_6H_4CO_2^-M^+$, $NRCOC_2H_4SO_2C_2H_4OSO_3^-M^+$, $NRCOC_2H_4SO_2C_6H_4SO_3^-M^+$, $NRCOC_2H_4SO_2C_6H_4CO_2^-M^+$, wherein R is independently hydrogen, $C_1-C_{12}$ substituted or unsubstituted alkyl, $C_2-C_{12}$ substituted or unsubstituted alkenyl, cyanoethyl, or a $C_7-C_{20}$ substituted or unsubstituted aralkyl or alkaryl; M is H, or an alkali metal ion, e.g., Li, Na, K, Cs, or Rb, and Q is as defined above. X is a halide or an anion derived from a mineral or organic acid.

Heterocyclic and cyclic versions of the ionic or ionizable groups described in general and specifically above can be used as well, such as N-substituted heterocycles. Specific examples include, but are not limited to,

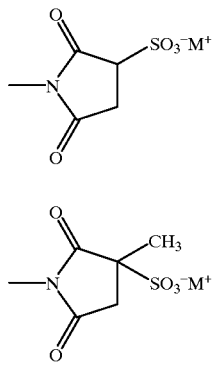

In the above N-ring formulas, the $SO_3^-$ is LG and $M^+$ is the counterion. The AG-Sp is the N-ring.

Examples of cyclic versions include:

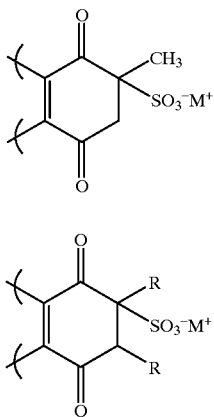

wherein R is as defined above, and the "wavy" lines signify the attachment to an organic group, such as an aromatic group. A more specific example is

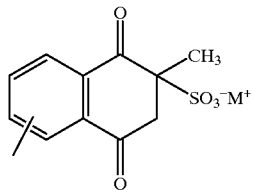

wherein the line signifies attachment to the carbon product. Under high temperature or basic conditions, these ring type structures may release sulfite ion.

A preferred organic group is $C_6H_4SO_2C_2H_4OSO_3^-Na^+$. The LG-Z part of the ionic or ionizable groups are preferably removed from the carbon product via an elimination reaction when the carbon product is placed, for instance, into an aqueous ink or coating formulation. The elimination may occur over a period of time, with or without heating. An example of such an elimination is the reaction of $SO_2C_2H_4OSO_3M$ groups with $(CH_3)_2NC_2H_4OH$ to form $SO_2CH_2=CH_2$ groups and $M^+H(CH_3)_2N^+C_2H_4OH\ SO_4^{2-}$. Aqueous and non-aqueous ink and coating compositions or formulations can be prepared which comprise one or more of these modified carbon products and an appropriate organic solvent or aqueous media, such as water. Once these modified carbon products are in a coating formulation, and the elimination reaction has occurred, the modified carbon product comprises carbon having attached at least one organic group, wherein the organic group comprises a) an aromatic group or a $C_1-C_{12}$ alkyl group and b) a group having the formula -AG-CH=$CH_2$, -AG-$C_2H_4OH$, or -AG-$C_2H_4$—O—$C_2H_4$-AG-, wherein each AG can be the same or different and is attached to the carbon. Inks and coatings containing these modified carbon products are also a part of the present invention.

The carbon may be of the crystalline and/or amorphous type. Examples include, but are not limited to, graphite, carbon black, vitreous carbon, activated charcoal, carbon fiber, activated carbon, and mixtures thereof. Finely divided forms of the above are preferred; also, it is possible to utilize mixtures of different carbons.

The modified carbon products may be prepared preferably by reacting carbon with a diazonium salt in a liquid reaction medium to attach at least one organic group to the surface of the carbon. The diazonium salt may contain the organic group to be attached to the carbon. A diazonium salt is an organic compound having one or more diazonium groups. Preferred reaction media include water, any medium containing water, and any medium containing alcohol. Water is the most preferred medium. Examples of modified carbon products, wherein the carbon is carbon black, and various preferred methods for their preparation are described in U.S. patent application Ser. No. 08/356,660 entitled "Reaction of Carbon Black with Diazonium Salts, Resultant Carbon Black Products and Their Uses," filed Dec. 15, 1994 and its continuation-in-part application, U.S. patent application Ser. No. 08/572,525, filed Dec. 14, 1995, both of which are incorporated herein by reference. Examples of modified carbon products, wherein the carbon is not carbon black, and various preferred methods for their preparation are described in U.S. Pat. No. 5,554,739 entitled "Reaction of Carbon Materials With Diazonium Salts and Resultant Carbon Products," WO 96/18696 and WO 96/18688, all incorporated herein by reference.

In the preferred preparation of the above modified carbon products, the diazonium salt need only be sufficiently stable to allow reaction with the carbon. Thus, that reaction can be carried out with some diazonium salts otherwise considered to be unstable and subject to decomposition. Some decomposition processes may compete with the reaction between the carbon and the diazonium salt and may reduce the total number of organic groups attached to the carbon. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. The diazonium salts may be prepared in situ. It is preferred that the modified carbon products of the present invention contain minimal amounts of by-products or unattached salts.

In the preferred process of preparation, carbon black can be reacted with a diazonium salt when present as a dilute, easily stirred, aqueous slurry, or in the presence of the proper amount of water for carbon black pellet formation. If desired, carbon black pellets may be formed utilizing a conventional pelletizing technology in batch or continuous mode. Other carbons can be similarly reacted with the diazonium salt. In addition, when modified carbon products utilizing carbon other than carbon black are, for instance, used in non-aqueous inks and coatings, the carbon should preferably be ground to a fine particle size before reaction with the diazonium salt in the preferred process to prevent unwanted precipitation of the modified carbon product in the inks and coatings. In addition, when modified carbon products utilizing carbon other than carbon black are used in ink jet inks, the carbon should preferably be ground to a fine particle size before reaction with the diazonium salt in the preferred process to prevent unwanted precipitation in the ink. An additional means of stabilization of the particles may be necessary in ink jet inks when using low amounts of organic groups on the carbon. One such means can be the use of a polymeric dispersant.

As stated earlier, the organic group comprises an aromatic group or a $C_1$–$C_{12}$ alkyl group. The aromatic group includes, but is not limited to, unsaturated cyclic hydrocarbons containing one or more rings. The aromatic group may be substituted or unsubstituted. Aromatic groups include aryl groups (for example, phenyl, naphthyl, anthracenyl, and the like), and heteroaryl groups (imidazolyl, pyrazolyl, pyridinyl, thienyl, thiazolyl, furyl, triazinyl, indolyl, and the like). The $C_1$–$C_{12}$ alkyl group may be branched or unbranched and is preferably ethyl.

Other additional organic groups may also be attached to the carbon product of the present invention. These additional other organic groups may comprise a) an aromatic group or a $C_1$–$C_{12}$ alkyl group and b) an ionic or ionizable group wherein the ionic or ionizable group is not eliminated from the organic group. Preferably, the additional, but optional, ionic or ionizable group is present at a concentration of less than about 2.4 micromoles/m². These additional ionizable groups are capable of forming an ionic group in the medium of use. The ionic group may be an anionic group or a cationic group and the ionizable group may form an anion or a cation. Examples of other additional organic groups that may be also attached include, for example, $C_6H_4SO_3^-Na^+$; and $C_6H_4CO_2^-Na^+$. Other examples are described in U.S. Patent Nos. 5,571,311 and 5,630,868; and in co-pending U.S. application Ser. Nos. 08/572,542; 08/663,707; and 08/663,694, all incorporated in their entirety by reference herein.

Dispersions of the modified carbon products of the present invention may be stabilized against premature elimination or hydrolysis with the addition of stabilizers or buffers such as sodium benzoate or sodium acetate. The stabilizers or buffers in the aqueous solution are generally at a level to improve the stability of these dispersions and is preferably less than about 0.05M. Carbon products comprising attached carboxylate groups in addition to groups of the formula -AG-Sp-LG-Z may have improved stability.

The modified carbon products of the present invention can be used in ink and coating formulations, both aqueous and non-aqueous. In general, an ink includes a colorant or pigment and solvents to adjust viscosity and drying. An ink may optionally further include a vehicle or varnish which functions as a carrier during printing and/or additives to improve printability, drying, and the like. For a general discussion on the properties, preparation and uses of inks, see *The Printing Manual*, 5th Ed., R. H. Leach, et al, Eds. (Chapman & Hall, 1993). Other known ink additives may be incorporated into the ink formulation. It is also within the bounds of the present invention to use an ink formulation containing a mixture of unmodified carbon with the modified carbon products.

The modified carbon products of the invention can be incorporated into an ink formulation using standard techniques either as a predispersion or as a solid. Use of the modified carbon products of the present invention may provide a significant advantage and cost savings by reducing the viscosity of the formulation. This may also allow higher loading of carbon product in a formulation. The milling time may be reduced as well. The modified carbon products of the present invention may also provide improved jetness, blue tone, and gloss.

The modified carbon products above may also be used in non-aqueous coating compositions such as paints or finishes. Thus, an embodiment of the present invention is a coating composition containing a suitable solvent and the modified carbon product of the present invention. Other conventional coating additives may be incorporated into the non-aqueous coating compositions such as a binder.

Non-aqueous coating formulations vary widely depending on the conditions and requirements of final use. In general, coating systems contain up to 30% by weight carbon. The resin content can vary widely up to nearly 100% by weight of the formulation. Examples include acrylic, alkyd, urethane, epoxy, cellulosics, and the like. Solvent content may vary between 0 and 80% by weight. Examples include aromatic hydrocarbons, aliphatic hydrocarbons, alcohols, polyalcohols, ketones, esters, and the like. Two other general classes of additives are fillers and modifiers. Examples of fillers are other coloring pigments (e.g., $TiO_2$, phthalo blue and the like), clays, talcs, silicas, and carbonates. Fillers can be added up to 60% by weight depending on final use requirements. Examples of modifiers are flow and leveling aids and biocides generally added at less than 5% by weight. The modified carbon products of the present invention can be incorporated into a non-aqueous coating composition using standard techniques either as a predispersion or as a solid.

Examples of non-aqueous media for the incorporation of compositions containing the modified carbon products of the present invention include, but are not limited to, melamine-acrylic resins, melamine-alkyd resins, urethane-hardened alkyd resins, urethane-hardened acrylic resins, and the like. The modified carbon products of the present invention may also be used in aqueous emulsion paints. In these types of paints, there is a non-aqueous portion containing the pigment wherein the non-aqueous portion is then dispersed in the aqueous paint. Accordingly, the modified carbon products of the present invention can be used as part of the non-aqueous portions which is then dispersed into the aqueous emulsion paints.

The modified carbon products of the present invention are also useful in aqueous ink and coating formulations. Aqueous includes mixtures of water and other water-miscible or -dispersible substances, such as an alcohol. Thus, the invention provides an aqueous ink composition comprising water and a modified carbon product according to the invention. Other known aqueous ink additives may be incorporated into the aqueous ink formulation. As stated previously, an ink may consist of the various components described above. Various aqueous ink compositions are also disclosed, for example, in U.S. Pat. Nos. 2,833,736; 3,607,813; 4,104,833; 4,308,061; 4,770,706; and 5,026,755, all incorporated herein by reference.

The modified carbon products of the present invention are also useful in inkjet ink formulations. The additives and formulations described in U.S. Pat. Nos. 5,571,311 and 5,630,868 can be used herein with the modified carbon products of the present invention.

The modified carbon products of the present invention, either as a predispersion or as a solid, can be incorporated into an aqueous ink formulation using standard techniques.

Flexographic inks represent a group of ink compositions. Flexographic inks generally include a colorant, a binder, and a non-aqueous or aqueous solvent. The modified carbon products of the invention may be useful as flexographic ink colorants. The modified carbon products of the invention may be used in aqueous news inks. For example, an aqueous news ink composition may comprise water, the modified carbon products of the invention, a resin and conventional additives such as antifoam additives or a surfactant.

The modified carbon products of this invention may also be used in aqueous coating compositions such as paints or finishes. Thus, an embodiment of the invention is an improved aqueous coating composition comprising water, resin and a modified carbon product according to the invention. Other known aqueous coating additives may be incorporated into the aqueous coating composition. See, for example, McGraw-Hill Encyclopedia of Science & Technology, 5th Ed. (McGraw-Hill, 1982), incorporated herein by reference. See also U.S. Pat. Nos. 5,051,464, 5,319,044, 5,204,404, 5,051,464, 4,692,481, 5,356,973, 5,314,945, 5,266,406, and 5,266,361, all incorporated herein by reference. The aqueous compositions of the present invention may also comprise additional other coloring pigments (e.g. $TiO_2$, phthalo blue and the like), clays, talc, silicas, and carbonates. The modified carbon products of the invention, either as a predispersion or as a solid, can be incorporated into an aqueous coating composition using standard techniques.

An ink or coating may be used for a variety of applications. Preferably, in aqueous inks and coatings of the present invention, the modified carbon products are present in an amount of less than or equal to 20% by weight of the ink or coating. It is also within the bounds of the present invention to use an aqueous or non-aqueous ink or coating formulation containing a mixture of unmodified carbon with the modified carbon products of the present invention. Common additives such as those discussed below may be added to the dispersion to further improve the properties of the aqueous ink or coating.

Also, the modified carbon products of the present invention can be used in ink jet inks where the ink formulation may be based on solvents, aqueous media, or an aqueous emulsion.

The following examples are intended to illustrate, not limit, the claimed invention.

BET Nitrogen surface areas were obtained using ASTM D-4820. CTAB area measurements were obtained using ASTM D-2414. L*a*b* values were determined with a Hunter Lab Scan 6000 with a setting at 10 degree D65 CIELAB color space.

The nitrogen and external surface area (t-area) was measured following the sample preparation and measurement procedure described in ASTM D-3037. For this measurement the nitrogen adsorption isotherm is extended up to 0.55 relative pressure. The relative pressure is the pressure (P) divided by the saturation pressure (Po, the pressure at which the nitrogen condenses). The adsorption layer thickness (t in angstroms) was calculated using the relation:

$$t=0.88(P/Po)^2+6.45(P/Po)+2.98.$$

The volume (v) of nitrogen adsorbed was then plotted against $t_1$ and a straight line was then fitted through the data points for t values between 3.9 and 6.2 angstroms. The t-area was then obtained from the slope of this line as follows:

$$t\text{-area, m}^2/\text{g}=15.47\times\text{slope}.$$

Sulfur contents on the carbon black product were determined by combustion analysis after Soxhlet washing of each sample. The mmol sulfur attached was determined by difference from the assay of the untreated carbon black.

EXAMPLE 1

Preparation of Carbon Black Products

This example illustrates the preparation of carbon black products identified as A–J. For each sample, a 10 g quantity of a carbon black with a CTAB surface area of 361 $m^2$/g and a DBPA of 117 mL/100 g was added to a solution of sulfanilic acid and 4-aminophenylsulfatoethylsulfone (APSES) (amounts indicated in the Table below) in about 90 g water that was stirred at 70° C. A solution of $NaNO_2$ in a few mL of water was added over one minute and the mixture was stirred at 70° C. for one hour. The resulting dispersion contained a carbon black product with attached $C_6H_4SO_3^-$ $Na^+$ and/or $C_6H_4SO_2C_2H_4OSO_3^-Na^+$ groups.

| Example | Sulfanilic acid, g | APSES, g | $NaNO_2$, g |
|---------|-------------------|----------|-------------|
| A | 0.61 | 1.49 | 0.61 |
| B | 0.00 | 4.08 | 1.01 |
| C | 1.30 | 0.90 | 0.74 |
| D | 1.75 | 1.24 | 1.00 |
| E | 0.87 | 2.14 | 0.87 |
| F | 1.96 | 0.37 | 0.87 |
| G | 1.37 | 0.25 | 0.61 |
| H | 0.00 | 3.00 | 0.74 |
| I | 1.85 | 0.00 | 0.74 |
| J | 2.50 | 0.00 | 1.00 |

EXAMPLE 2

Preparation of carbon black product

An eight inch pelletizer was charged with 300 g of a carbon black with a CTAB surface area of 350 $m^2$/g and a DBPA of 120 mL/100 g, sulfanilic acid (SA) and 4-aminophenylsulfatoethylsulfone (APSES) (in the amounts indicated in the Table below). The pelletizer was run at 100 rpm for one minute. A solution of $NaNO_2$ in deionized water at 65° C. was added and the pelletizer was run for one minute at 600 rpm. An additional five grams of water was added, and the pelletizer was run for a further minute at 600 rpm. 4-Sulfobenzenediazonium hydroxide inner salt and/or 4-(2-sulfatoethyl)sulfonylbenzenediazonium hydroxide inner salt were formed in situ, and they reacted with the carbon black. The products had attached p-$C_6H_4SO_3^-Na^+$ and/or p-$C_6H_4SO_2C_2H_4OSO_3^-Na^+$ groups. Samples of selected products were boiled in 0.5 M NaOH for one hour and extracted with water overnight in a Soxhlet extractor, dried and analyzed for sulfur to determine the amount of attached sulfone.

| Example | SA g | APSES g | $NaNO_2$ g | $H_2O$ g | Total treatment level, $\mu mol/m^2$ | Attached sulfone, $\mu mol/m^2$ |
|---|---|---|---|---|---|---|
| 2A | 0 | 122 | 31.0 | 253 | 4.14 | 3.26 |
| 2B | 0 | 106 | 26.9 | 253 | 3.60 | 2.88 |
| 2C | 0 | 90.2 | 22.8 | 253 | 3.06 | 2.69 |
| 2D | 26.5 | 63.7 | 26.9 | 229 | 3.62 | — |
| 2E | 24.1 | 57.8 | 22.8 | 253 | 3.29 | — |

EXAMPLE 3

Preparation of a Carbon Black Product

An eight inch pelletizer was charged with 300 g of a carbon black with a CTAB surface area of 350 $m^2/g$ and a DBPA of 120 mL/100 g and 66.1 g of sulfanilic acid. The pelletizer was run at 100 rpm for one minute. A solution at 65° C. of deionized water (228.5 g) and $NaNO_2$ (26.9 g) was added and the pelletizer was run for one minute at 600 rpm. An additional five grams of water was added, and the pelletizer was run for a further minute at 600 rpm. 4-Sulfobenzenediazonium hydroxide inner salt was formed in situ, and it reacted with the carbon black. A sample of the product was dried, extracted overnight with methanol in a Soxhlet extractor, dried and analyzed for sulfur. The product had 2.96 $\mu mol/m^2$ of attached p-$C_6H_4SO_3^-Na^+$ groups.

EXAMPLE 4

Preparation of carbon black products 100 parts per hour of a carbon black having a CTAB surface area of 361 $m^2/g$ and DBPA of 117 mL/100 g was charged into a continuously operating pin mixer with sulfanilic acid and sodium nitrite as an aqueous solution. The resultant material was dried to give a pelleted carbon black product having attached p-$C_6H_4SO_3^-Na^+$ groups.

| Example | Sulfanilic acid, parts/hr | $NaNO_2$, parts/hr |
|---|---|---|
| 4A | 25 | 10 |
| 4B | 18 | 7.2 |

EXAMPLE 5

Use of Carbon Black Products in Coating Compositions

This example illustrates the use of the carbon black products of Examples 1 in aqueous thermoset acrylic compositions. The coating compositions were prepared as follows:

Composition A: Water (289 g), 0.5 g of Patco 845 defoamer and 17 g of dimethylethanolamine were mixed for five minutes using a low shear mixer. Cargill 17-7241 acrylic resin (172 g) and 21.5 g SURFYNOL CT136 surfactant were added and the composition was mixed for an additional ten minutes with a low shear mixer. Patco 845 defoamer is available from American Ingredients Co., Kansas City, Mo. Cargill 17-4271 acrylic resin is available from Cargill, Inc., Minneapolis, Minn. SURFYNOL CT136 is a registered trademark of Air Products and Chemicals, Inc., Allentown, Pa.

Composition B: Water (61.0 g), 84.4 g of Cargill 17-7241 acrylic resin, 10.1 g of dimethylethanolamine, 19.8 g of Cargill 23-2347 melamine resin, and 1.14 g of BYK-306 surfactant were mixed with a low shear mixer of ten minutes. Cargill 23-2347 melamine resin is available from Cargill, Inc., Minneapolis, Minn. BYK-306 is a registered trademark for surfactants produced and sold by BYK-Chemie U.S.A., Wallingford.

Composition C: A 2 wt % dispersion of the carbon black products of Examples 1 was prepared by adding the carbon black product to water and stirring under low shear for about 15 mins. This dispersion (12.5 g) was mixed with 3.2 g of Composition A and 9.3 g of Composition B (9.3 g) for 20 minutes using a magnetic stirrer. The coating composition was allowed to stand before use for the indicated time.

A control coating composition was prepared from a carbon black with a nitrogen surface area of 560 $m^2/g$, a DBPA of 100 mL/100 g and a volatile content of 9.5%. Composition A (28.2 g), 19.4 g of water, 2.6 g of the carbon black, and 150 g of #550 steel shot were shaken in a ½ pint can on a paint shaker for three hours. After filtering, 5.7 g of this material was added to 19.3 of composition B and the mixture was stirred with a magnetic stir bar for 15 minutes. The coating composition was allowed to stand for the indicated time before use.

The coatings were drawn down on Leneta paper with a 3 mil Bird applicator and dried at 163° C. for 15 minutes. A clear coat was applied, and the samples were dried again. The L*, a*, and b* values were measured and compared to those of the control black. The table below shows that coatings with improved jetness were obtained when the carbon black products of Examples 1 are used having attached p-$C_6H_4SO_2C_2H_4OSO_3^-Na^+$ groups.

| Carbon from Example | Time (Days) | ΔL* | Δa* | Δb* |
|---|---|---|---|---|
| A | 9 | −0.51 | 0.10 | −0.09 |
| B | 9 | −0.29 | 0.07 | 0.26 |
| C# | 7 | −0.23 | 0.02 | 0.21 |
| D## | 7 | 0.04 | −0.02 | 0.08 |
| D## | 9 | −0.16 | 0.09 | −0.12 |
| E | 7 | −0.41 | 0.02 | 0.14 |
| F | 7 | 0.08 | −0.07 | 0.11 |
| F | 9 | −0.03 | 0.19 | −0.18 |
| G | 7 | −0.32 | −0.02 | 0.10 |
| H | 7 | −0.24 | 0.23 | 0.22 |
| I | 7 | 0.21 | 0.09 | 0.20 |
| J | 7 | 0.07 | −0.15 | 0.16 |

Results are the average of three runs
Results are the average of two runs

EXAMPLE 6

Use of a carbon black product in a coating composition

This example illustrates the use of the carbon black product of Example 1B in the aqueous coating composition of Example 5. The coating was prepared and evaluated as in Example 5, except that the coatings were drawn down at different times and evaluated with and without the clear coat. The results in the table show that the jetness of the coating improved when the liquid coating formulation is allowed to stand for a period of time prior to use.

| Time | With clear coat | | | Without clear coat | | |
|---|---|---|---|---|---|---|
| | ΔL* | Δa* | Δb* | ΔL* | Δa* | Δb* |
| 1 Hr | 0.34 | 0.19 | 0.40 | 0.36 | 0.30 | 0.34 |
| 24 Hr | 0.01 | 0.15 | 0.27 | 0.14 | 0.15 | 0.26 |
| 3 Days | −0.28 | −0.06 | 0.17 | −0.31 | 0.08 | 0.26 |
| 7 Days | −0.40 | 0.00 | 0.04 | −0.20 | 0.21 | 0.32 |
| 9 Days | −0.29 | 0.07 | 0.26 | −0.24 | 0.05 | 0.47 |

EXAMPLE 7

Use of carbon black products in a coating composition

This example illustrates the use of the carbon black products of Examples 2–4 in aqueous thermoset acrylic coating compositions. The coating compositions were prepared as follows:

Composition A: Water (289.2 g), 0.4 g of Patco 845 defoamer and 17.0 g of dimethylethanolamine were mixed for five minutes using a low shear mixer. Cargill 17-7241 acrylic resin (86.0 g) and 10.7 g of SURFYNOL CT136 surfactant were added and the composition was mixed for an additional ten minutes with a low shear mixer.

Composition B: Water (685.5 g), 230.2 g of Cargill 17-7241 acrylic resin, 27.4 g of dimethylethanolamine, 54.0 parts of Cargill 23-2347 melamine resin and 3.0 parts of BYK-306 surfactant were mixed with a low shear mixer for ten minutes.

Composition C: A 10 wt % dispersion of the carbon black products of Example 2B was prepared by adding the carbon black product to water and stirring under low shear for about 15 mins. This dispersion (2.5 g) was mixed with 3.2 g of Composition A and 19.3 g of Composition B for 20 minutes using a magnetic stirrer. The coating composition was allowed to stand for the indicated time before use.

The coatings were evaluated by the method of Example 5 and were compared against the control coating from Example 5. The table below shows that coatings with improved jetness were obtained when the carbon black products of Example 2 having attached $C_6H_4SO_2C_2H_4OSO_3^-Na^+$ groups were used.

| Carbon from Example | Time, days | SA treatment level, μmol/m² | APSES treatment level, μmol/m² | Total treatment level, μmol/m² | ΔL* | Δa* | Δb* |
|---|---|---|---|---|---|---|---|
| 2A | 5 | 0 | 4.14 | 4.14 | −0.40 | 0.12 | 0.18 |
| 2B | 2 | 0 | 3.60 | 3.60 | −0.61 | 0.05 | 0.03 |
| 2B | 5 | 0 | 3.60 | 3.60 | −0.61 | 0.12 | 0.05 |
| 2C | 5 | 0 | 3.06 | 3.06 | −0.47 | 0.02 | 0.07 |
| 2D | 5 | 1.46 | 2.16 | 3.62 | −0.32 | 0.05 | 0.14 |
| 2E | 5 | 1.33 | 1.96 | 3.29 | −0.44 | −0.07 | 0.17 |
| 3 | 5 | 3.63 | 0 | 3.63 | 0.27 | −0.02 | 0.10 |
| 4A | 5 | 4.14 | 0 | 4.14 | 0.30 | −0.06 | 0.14 |
| 4B | 5 | 2.97 | 0 | 2.97 | 0.02 | 0.18 | −0.01 |

EXAMPLE 8

Use of a carbon black product in a coating composition

This example illustrates the use of the carbon black product of Example 2B in aqueous coating compositions similar to those of Example 5 except that they contain different amines. The coating compositions were prepared as follows:

Composition A: Water (57.8 g), 0.1 g of Patco 845 defoamer and the amine were mixed for five minutes using a low shear mixer. Cargill 17-7241 acrylic resin (34.4 g) and 4.3 g SURFYNOL CT136 surfactant were added and the composition was mixed for an additional ten minutes with a low shear mixer.

Composition B: Water (342.7 g), 115.1 g of Cargill 17-7241 acrylic resin, the amine, 27.0 g of Cargill 23-2347 melamine resin and 1.5 g of BYK-306 surfactant were mixed with a low shear mixer for ten minutes.

Composition C: A 10 wt % dispersion of the carbon black products of Example 2B was prepared by adding the carbon black product to water stirring under low shear for about 15 mins. This dispersion (2.5 g) was mixed with 3.2 g of Composition A and 19.3 g of Composition B for 20 minutes using a magnetic stirrer. The coating composition was allowed to stand for the indicated time before use.

The coatings were evaluated by the method of Example 5 and were compared against the control coating from Example 5.

| Amine | Wt amine for Composition A, g | Wt amine for Composition B, g | Time, Hr | ΔL* | Δa* | Δb* |
|---|---|---|---|---|---|---|
| Triethylamine | 3.9 | 15.5 | 1 | −0.05 | 0.06 | −0.05 |
| Triethylamine | 3.9 | 15.5 | 120 | −0.28 | 0.17 | 0.15 |
| 2-Amino-2-methylpropanol | 3.4 | 13.7 | 1 | 0.82 | 0.38 | 0.82 |
| 2-Amino-2-methylpropanol | 3.4 | 13.7 | 120 | −0.07 | 0.05 | 0.24 |

EXAMPLE 9

Preparation of a carbon black product 100 parts per hour of a carbon black with a CTAB surface area of 361 m²/g and a DBPA of 117 mL/100 g was charged into a continuously operating pin mixer with 35 parts per hour of p-aminophenylsulfatoethylsulfone and 100.4 parts per hour of a 9% aqueous solution of sodium nitrite. The product had attached $C_6H_4SO_2C_2H_4OSO_3^-Na^+$ groups.

EXAMPLE 10

Use of carbon black products in a coating formulation

This example illustrates the use of the carbon black product of Example 9 in the aqueous coating composition of Example 5. The coating was prepared and evaluated as in Example 5 after eight days. The coating had ΔL*, Δa*, and Δb* values of −0.43, 0.00 and 0.15, respectively.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A modified carbon product comprising carbon having attached at least one organic group wherein the organic group comprises a) at least one aromatic group or a $C_1$–$C_{12}$ alkyl group, and b) an ionic or ionizable group having the formula -AG-Sp-LG-Z, wherein AG is an activating group, Sp is a spacer group which assists the activating group to promote elimination of LG, LG is a leaving group and Z is a counterion, and wherein the aromatic or the $C_1$–$C_{12}$ alkyl group is directly attached to the carbon and wherein said ionic or ionizable group comprises a cyclic or heterocyclic group.

2. The modified carbon product of claim 1, wherein said counterion is H, Li, Na, K, Rb, Cs, or a halide or anion derived from a mineral or organic acid.

3. A coating composition comprising water or a non-aqueous solvent, the modified carbon product of claim 1, and a coloring pigment other than carbon black.

4. A coating composition comprising water or a non-aqueous solvent, the modified carbon product of claim 1 and clay, talc, silica, or a carbonate.

5. The modified carbon product of claim 1, wherein said ionic or ionizable group comprises a cyclic or heterocyclic group.

6. The modified carbon product of claim 1, wherein said ionic or ionizable group is

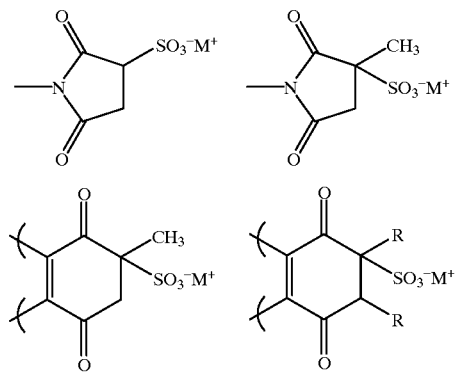

wherein R is independently hydrogen, $C_1$–$C_{12}$ substituted or unsubstituted alkyl, $C_2$–$C_{12}$ substituted or unsubstituted alkenyl, cyanoethyl, or a $C_7$–$C_{20}$ substituted or unsubstituted aralkyl or alkaryl.

7. The modified carbon product of claim 1, wherein said ionic or ionizable group is a N-substituted heterocycle.

8. The modified carbon product of claim 1, wherein said activating group is —$SO_2$—, —$NRSO_2$—, —NRCO—, —$O_2C$—, or —$SO_2NH$—, wherein R is independently hydrogen, $C_1$–$C_{12}$ substituted or unsubstituted alkyl, $C_2$–$C_{12}$ substituted or unsubstituted alkenyl, cyanoethyl, or a $C_7$–$C_{20}$ substituted or unsubstituted aralkyl or alkaryl.

9. A coating composition comprising water or a non-aqueous solvent, the modified carbon product of claim 8, and a coloring pigment other than carbon black.

10. The modified carbon product of claim 1, wherein said leaving group is —$OSO_3^-$, —$SSO_3^-$, —$OPO_3^{2-}$, —$SO_3^-$ or $Q^+$, when $Q^+$ is $NR_3^+$, $N(C_2H_4)_3N^+$, or a N-substituted heterocycle, wherein R is independently hydrogen, $C_1$–$C_{12}$ substituted or unsubstituted alkyl, $C_2$–$C_{12}$ substituted or unsubstituted alkenyl, cyanoethyl, or a $C_7$–$C_{20}$ substituted or unsubstituted aralkyl or alkaryl.

11. A coating composition comprising water or a non-aqueous solvent, the modified carbon product of claim 10, and a coloring pigment other than carbon black.

12. The modified carbon product of claim 1, wherein the carbon is carbon black, graphite, carbon fiber, vitreous carbon, finely-divided carbon, activated charcoal, activated carbon, or mixtures thereof.

13. The modified carbon product of claim 12, wherein the carbon is carbon black.

14. The modified carbon product of claim 1, wherein said organic group is present at a level of from about 0.10 to about 4.0 micromoles/$m^2$ of the carbon used based on CTAB or t-area of the carbon.

15. The modified carbon product of claim 14, wherein said level is from about 2.0 to about 3.3 micromoles/$m^2$ of the carbon used based on CTAB or t-area of the carbon.

16. A modified carbon product of claim 1, wherein said LG is eliminated.

17. The modified carbon product of claim 16, wherein said modified carbon product after LG is eliminated is N(COCH=CHCO) or N(COCH=CCH$_3$CO).

18. A modified carbon product of claim 16, wherein said modified carbon product is subjected to hydrolysis.

19. The modified carbon product of claim 16, wherein said activating group is —$SO_2$, —$NRSO_2$, —NRCO, —$O_2C$, or —$SO_2NH$, wherein R is independently hydrogen, $C_1$–$C_{12}$ substituted or unsubstituted alkyl, $C_2$–$C_{12}$ substituted or unsubstituted alkenyl, cyanoethyl, or a $C_7$–$C_{20}$ substituted or unsubstituted aralkyl or alkaryl.

20. The modified carbon product of claim 1, wherein said spacer group is an ethylene group or a substituted ethylene group.

21. A coating composition comprising water or a non-aqueous solvent, the modified carbon product of claim 20, and a coloring pigment other than carbon black.

22. The modified carbon product of claim 20, wherein said spacer group is a group with at least one hydrogen on the carbon which is adjacent to -AG.

23. A coating composition comprising water or a non-aqueous solvent, the modified carbon product of claim 22, and a coloring pigment other than carbon black.

24. The modified carbon product of claim 1, further comprising a second organic group attached to said carbon, wherein said second organic group comprises a) an aromatic group of a $C_1$–$C_{12}$ alkyl group and b) an ionic or ionizable group, wherein the ionic or ionizable group is not eliminated from the organic group.

25. The modified carbon product of claim 24, wherein said second organic group is present on the carbon at a concentration of less than about 2.4 micromoles/$m^2$.

26. A coating composition comprising water or a non-aqueous solvent, the modified carbon product of claim 24, and a coloring pigment other than carbon black.

27. An ink composition comprising a) the modified carbon product of claim 24 and b) a non-aqueous or aqueous vehicle.

28. A coating composition comprising a) the modified carbon product of claim 24 and b) a non-aqueous or aqueous vehicle.

29. The modified carbon product of claim 24, wherein said second organic group is $C_6H_4SO_3^-Na^+$ or $C_6H_4CO_2^-Na^+$.

30. A coating composition comprising water or a non-aqueous solvent, the modified carbon product of claim 28, and a coloring pigment other than carbon black.

31. An ink composition comprising a) the modified carbon product of claim 1 and b) a non-aqueous or aqueous vehicle.

32. The ink composition of claim 31, wherein the carbon is carbon black, graphite, carbon fiber, vitreous carbon, finely-divided carbon, activated charcoal, activated carbon, or mixtures thereof.

33. The ink composition of claim 32, wherein the carbon is carbon black.

34. A coating composition comprising a) the modified carbon product of claim 1 and b) a non-aqueous or aqueous vehicle.

35. The coating composition of claim 34, wherein the carbon is carbon black, graphite, carbon fiber, vitreous carbon, finely-divided carbon, activated charcoal, activated carbon, or mixtures thereof.

36. The coating composition of claim 35, wherein the carbon is carbon black.

37. A coating composition comprising water or a non-aqueous solvent, the modified carbon product of claim 36, and a coloring pigment other than carbon black.

38. An ink jet ink composition comprising a) the modified carbon product of claim 1 and b) a non-aqueous or aqueous vehicle.

39. The ink jet ink composition of claim 38, wherein the carbon is carbon black, graphite, carbon fiber, vitreous carbon, finely-divided carbon, activated charcoal, activated carbon, or mixtures thereof.

40. The ink jet ink composition of claim 39, wherein said carbon is carbon black.

41. A modified carbon product comprising carbon having attached at least one organic group wherein the organic group comprises a) at least one aromatic group or a $C_1$–$C_{12}$ alkyl group, and b) a group having the formula N(COCH—CHCO); or N(COCH—CCH$_3$CO), or AG comprises or forms part of a cyclic or heterocyclic group, wherein the aromatic or the $C_1$–$C_{12}$ alkyl group is directly attached to the carbon.

42. A coating composition comprising water or a non-aqueous solvent, the modified carbon product of claim 41, and a coloring pigment other than carbon black.

43. An ink composition comprising a) the modified carbon product of claim 41 and b) a non-aqueous or aqueous vehicle.

44. The ink composition of claim 43, wherein the carbon is carbon black, graphite, carbon fiber, vitreous carbon, finely-divided carbon, activated charcoal, activated carbon, or mixtures thereof.

45. A coating composition comprising a) the modified carbon product of claim 41 and b) a non-aqueous or aqueous vehicle.

46. The coating composition of claim 45, wherein the carbon is carbon black, graphite, carbon fiber, vitreous carbon, finely-divided carbon, activated charcoal, activated carbon, or mixtures thereof.

47. An ink jet ink composition comprising a) the modified carbon product of claim 41 and b) a non-aqueous or aqueous vehicle.

48. The ink jet ink composition of claim 47, wherein the carbon is carbon black.

49. The modified carbon product of claim 41, further comprising a second organic group attached to said carbon, wherein said second organic group comprises a) an aromatic group or a $C_1$–$C_{12}$ alkyl group and b) an ionic or ionizable group wherein the ionic or ionizable group is not eliminated from the organic group.

50. The modified carbon product of claim 49, wherein said second organic group is $C_6H_4SO_3^-Na^+$ or $C_6H_4CO_2^-Na^+$.

51. The modified carbon product of claim 50, wherein said second organic group is present on the carbon at a concentration of less than about 2.4 micromoles/m$^2$.

52. An aqueous composition comprising a) the modified carbon product of claim 1 and b) a buffer, a stabilizer, or both.

53. The aqueous composition of claim 52, wherein said buffer is sodium benzoate or sodium acetate.

* * * * *